(12) United States Patent
McAllister

(10) Patent No.: US 6,484,374 B2
(45) Date of Patent: *Nov. 26, 2002

(54) FLEXIBLE CLAMP DEVICE

(75) Inventor: Robert J. McAllister, Solana Beach, CA (US)

(73) Assignee: Gold Star Plastics, Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/877,511

(22) Filed: Jun. 8, 2001

(65) Prior Publication Data

US 2001/0039699 A1 Nov. 15, 2001

Related U.S. Application Data

(63) Continuation-in-part of application No. 09/373,485, filed on Aug. 12, 1999, now Pat. No. 6,343,409.

(51) Int. Cl.[7] .............................................. B65B 67/04
(52) U.S. Cl. .......................................... 24/557; 24/561
(58) Field of Search .......................... 24/502, 503, 513, 24/515, 535–537, 30.5 R, 554, 557, 561, 562; 220/495.11, 495.06, 495.08, 908.1; 294/98.2, 100

(56) References Cited

U.S. PATENT DOCUMENTS

| 969,695 | A | * | 9/1910 | Holsey |
| 1,030,386 | A | | 6/1912 | Comeau |
| 2,523,780 | A | * | 9/1950 | Rodriguez |
| 2,875,970 | A | * | 3/1959 | Gardner |
| 3,100,324 | A | | 8/1963 | Tutino et al. |
| 3,502,238 | A | * | 3/1970 | Kelley |
| 3,675,940 | A | | 7/1972 | Crookston |
| 3,869,760 | A | | 3/1975 | Meyer |
| 3,891,335 | A | | 6/1975 | Fell |
| 3,967,030 | A | | 6/1976 | Schultz |
| 4,312,295 | A | | 1/1982 | Harrington |
| 4,557,503 | A | | 12/1985 | Linn |
| 4,669,797 | A | | 6/1987 | Bourdon |
| 4,838,451 | A | | 6/1989 | Arkell |
| 4,899,967 | A | * | 2/1990 | Johnson |
| 4,925,056 | A | * | 5/1990 | McCoig |
| 5,190,183 | A | * | 3/1993 | McNaughton et al. |
| 5,363,539 | A | | 11/1994 | Tisol |
| 5,388,313 | A | | 2/1995 | Cameron |
| 5,539,963 | A | | 7/1996 | Fujiwara et al. |
| 5,671,861 | A | * | 9/1997 | Hall et al. |
| 5,845,883 | A | | 12/1998 | Meyer |
| 5,944,236 | A | | 8/1999 | Clinque |
| 6,017,069 | A | | 1/2000 | Imms et al. |
| 6,071,037 | A | * | 6/2000 | Holt |
| 6,086,022 | A | | 7/2000 | Dalton |
| 6,343,409 | B1 | * | 2/2002 | McAllister |

FOREIGN PATENT DOCUMENTS

| GB | 2158138 | | 11/1985 |
| JP | 7-149326 | * | 6/1995 |

* cited by examiner

Primary Examiner—James R. Brittain
(74) Attorney, Agent, or Firm—The Maxham Firm

(57) ABSTRACT

A one piece clamp for affixing a pliable bag to a container. The device can be deformed to an open position and normally assumes a closed position. While in the closed position, the clamp is in condition to secure a bag to a container. The clamp may be deformed to place it in position on the lid of a container, and to allow release of the bag from the container.

7 Claims, 5 Drawing Sheets

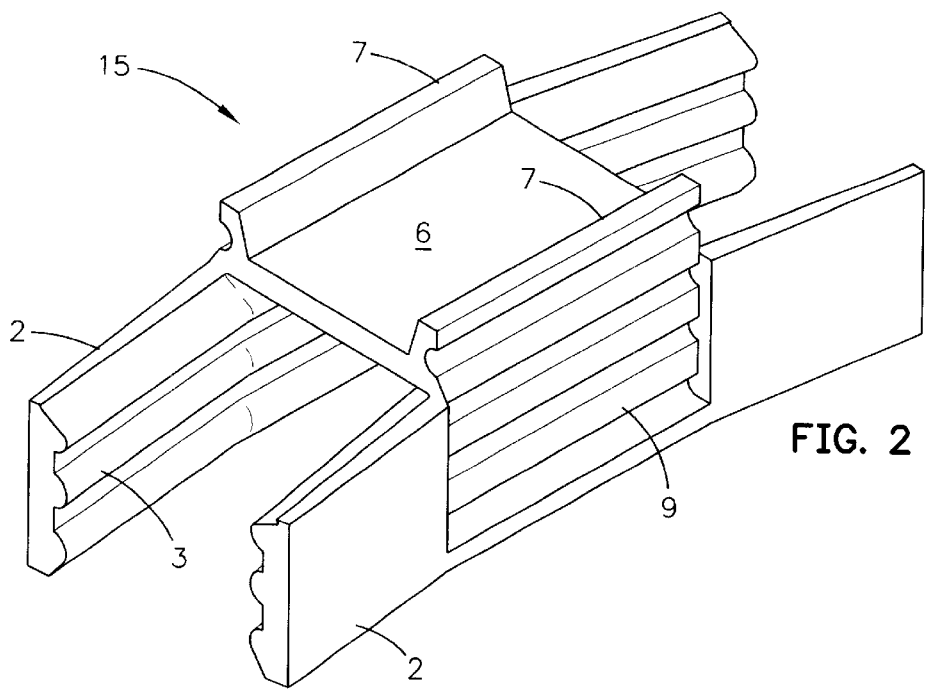
FIG. 2
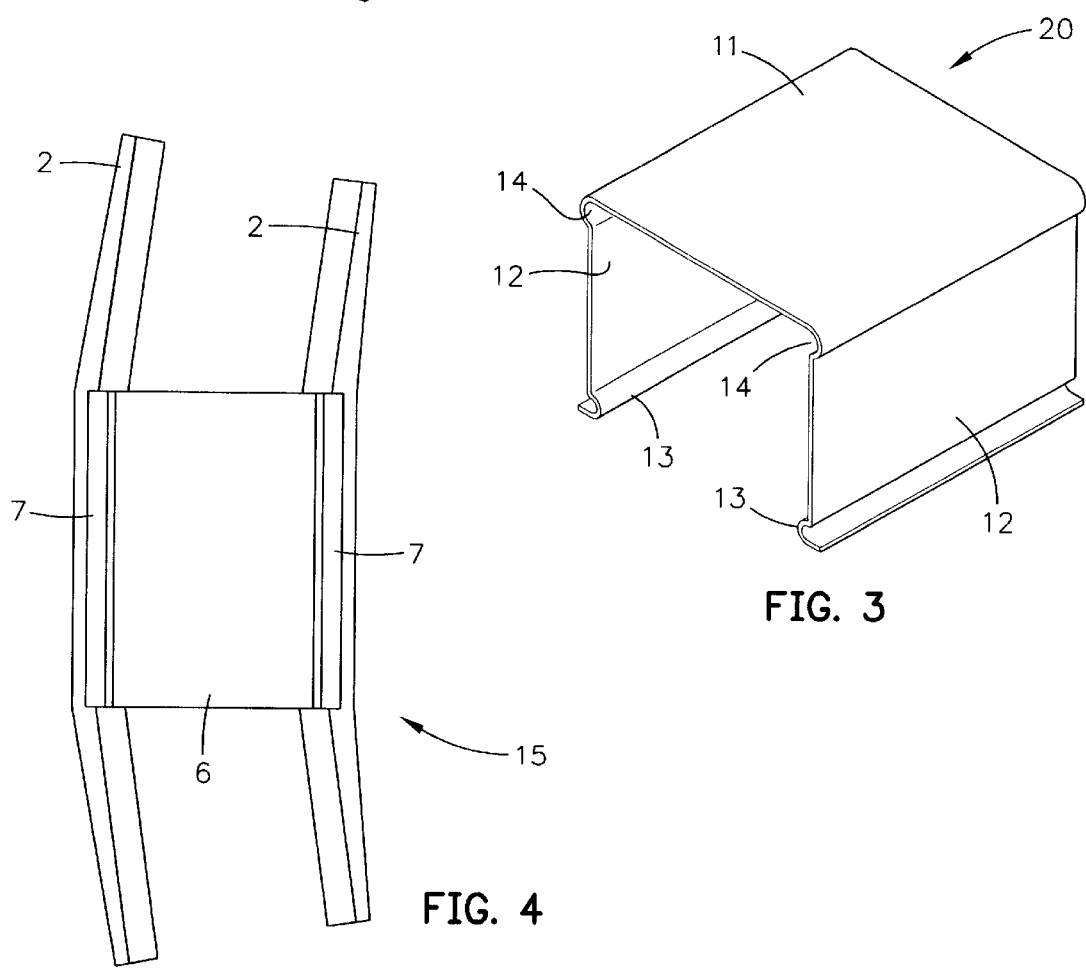
FIG. 3
FIG. 4

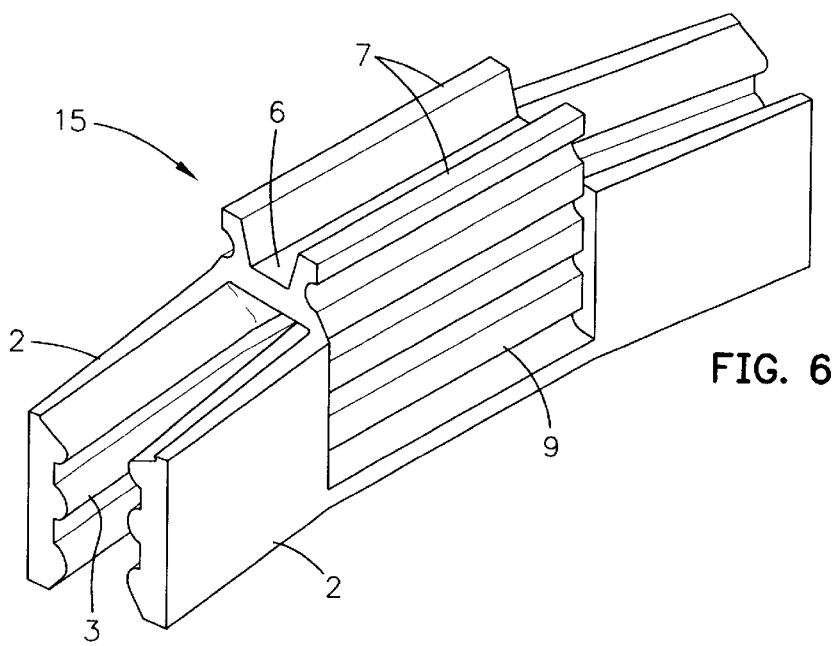
FIG. 6
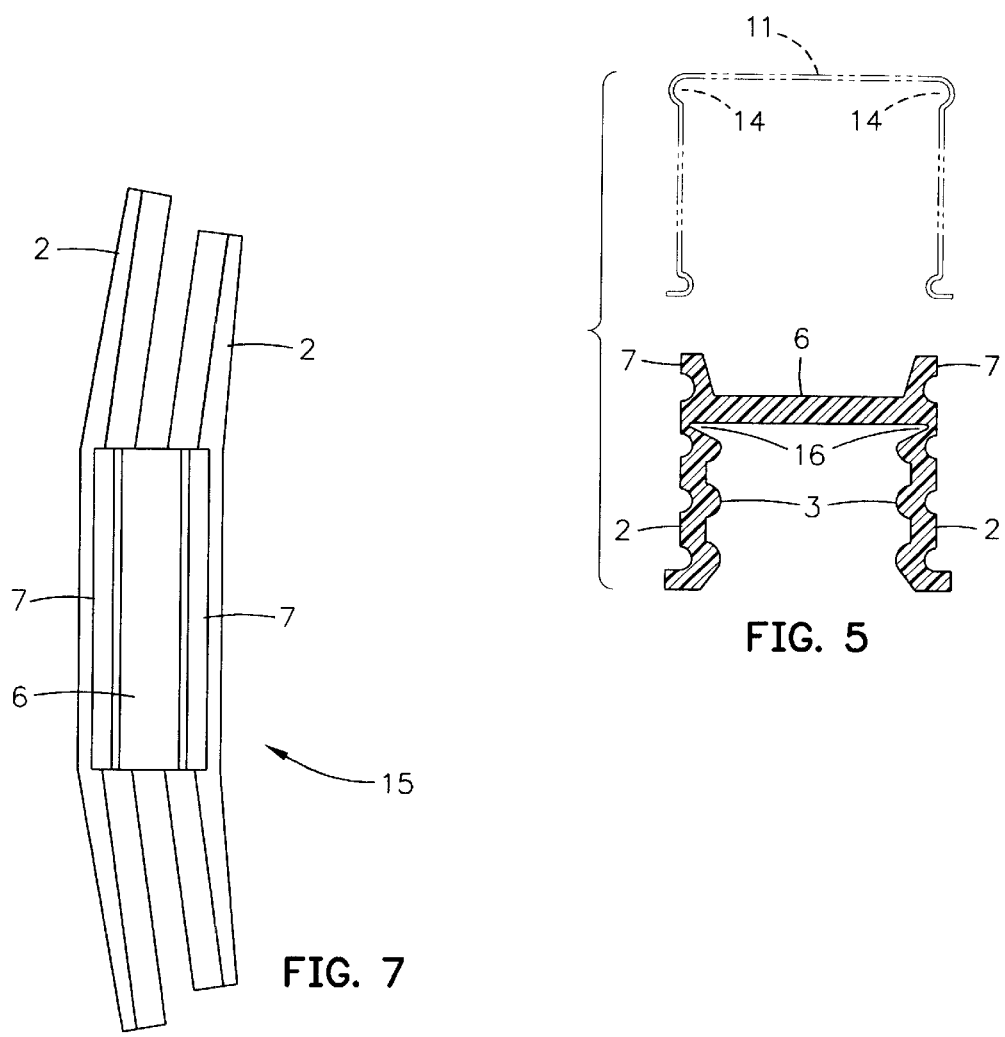
FIG. 5
FIG. 7

FLEXIBLE CLAMP DEVICE

REFERENCE TO RELATED APPLICATIONS

This is a continuation-in-part of application Ser. No. 09/373,485, filed Aug. 12, 1999, which has now issued as U.S. Pat. No. 6,343,409 on Feb. 5, 2002.

BACKGROUND OF THE INVENTION

1. Field of the Invention

The present invention generally relates to clamping devices, and more particularly to a simple, efficient clip device to fasten a plastic trash bag to a rigid container.

2. Discussion of the Related Art

Virtually all human activity results in the generation of some refuse or waste. The sanitary storage and collection of waste is a hallmark of a civilized society. People generally store waste, or trash, in relatively small containers ranging anywhere from one to 55 gallons in size. Plastic or paper liners, or bags, are frequently used in an effort to keep these containers clean, and to facilitate easy removal of the trash. These liners are placed inside the rigid trash container and frequently are attempted to be secured to the container by folding the upper section of the bag over the lip of the container.

Several disadvantages exist with this arrangement. When garbage is placed in the bag, the bag often detaches from the lip of the container and falls to the bottom of the container, where it becomes another trash item. Attempts to remedy this by closely matching the bag opening with the container opening frequently result in bags that split or tear when folded over the container lip. And a bag that splits, or otherwise detaches from the container fails to perform its primary task of holding the refuse placed within it, and protecting the container from soiling.

SUMMARY OF THE INVENTION

The present invention solves the problem of pliable bags becoming detached from containers. Broadly, the present invention provides for the secure removable fastening of bags to containers.

More specifically, one embodiment of the invention attaches a pliable bag to a container by locating a clip over a portion of the bag and container so that a gripping section of the clip secures the bag against the container. The clip is positioned over the bag and container by applying pressure to the upwardly projecting grip, which causes the arms of the clip to separate sufficiently to be placed over the bag which is layed over the rim of the container. The clip secures the bag and container once pressure is removed from the grip.

The invention affords its users with a number of distinct advantages. First, trash bags no longer need to be folded over container lips, thus avoiding the possibility of tearing bags. Second, the bag remains securely attached to the container lip at all times and thus can perform its intended functions of containing refuse and protecting the container from being soiled by the refuse. Additionally, the clip of this invention has a low profile so that when it is in use it does not interfere with use of the container cover to close the top of the container.

BRIEF DESCRIPTION OF THE DRAWING

The objects, features and advantages of the invention will become more apparent to those skilled in the art after considering the following detailed description, when read in connection with the accompanying drawing, wherein:

FIG. 2 is a perspective view of the gripping unit shown in FIG. 1;

FIG. 3 is a perspective view of the clasping unit shown in FIG. 1;

FIG. 4 is a top view of the gripping unit shown in FIG. 1;

FIG. 5 is an end elevation view of the gripping unit and a phantom elevation view of the clasping unit shown in FIG. 1;

FIG. 6 is a perspective view of an alternative embodiment of the gripping unit of the invention;

FIG. 7 is a top view of the gripping unit shown in FIG. 6;

DETAILED DESCRIPTION OF THE PREFERRED EMBODIMENTS

Throughout this description, the preferred embodiment and examples shown should be considered as exemplars, rather than as limitations on the present invention. In the following paragraphs, the present invention will be described in detail by way of example with reference to the attached drawings.

The clip assembly according to the present invention provides a quick and reliable way to secure or fasten a pliable bag to a container by using two gripping arms and a clasp that forces the gripping arms to removably hold the bag against the container. The clip assembly also has a low profile that permits container lids to fit over the container without interfering with the clip assembly. The clip assembly is also easy to use and inexpensive.

Figure 1:
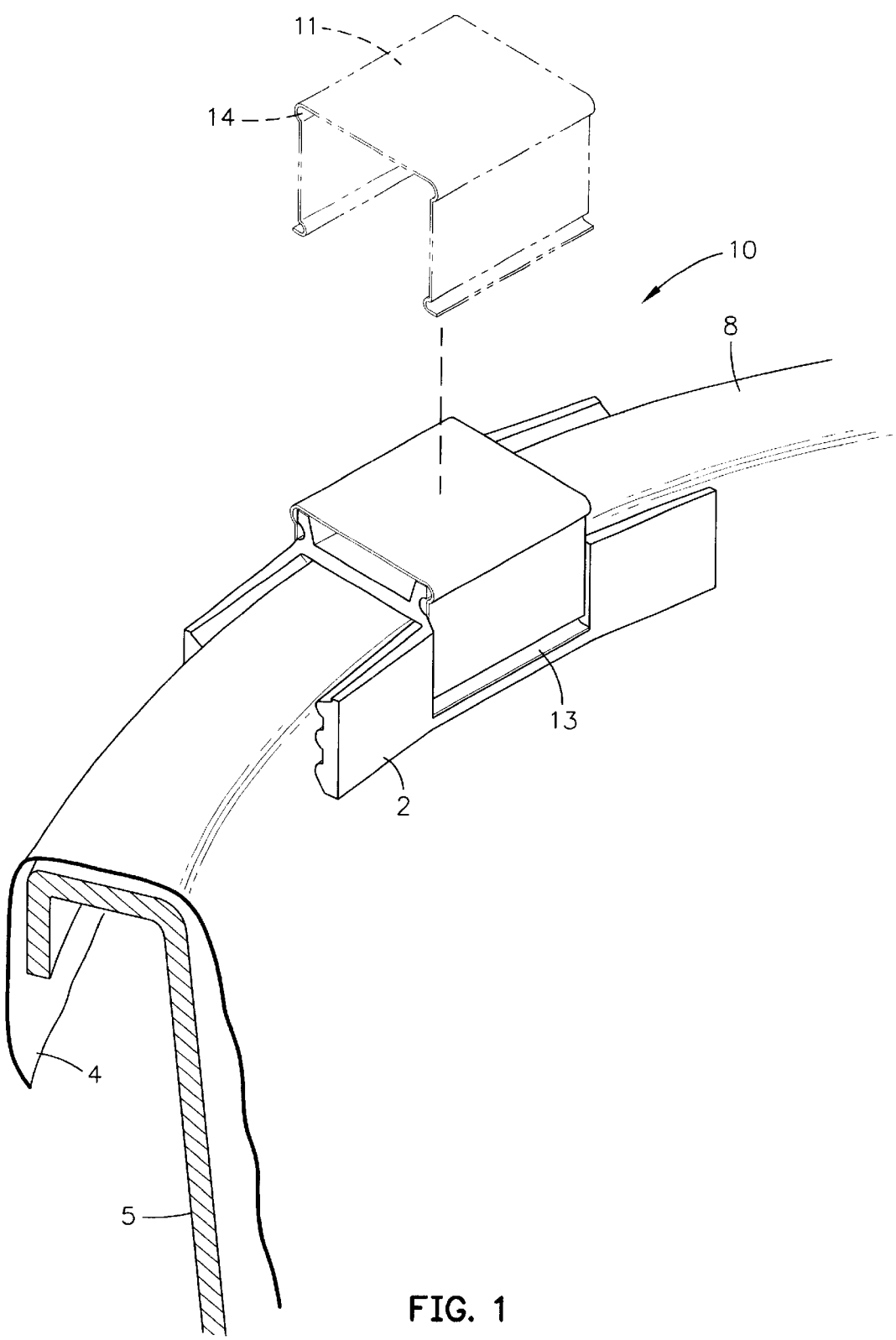
FIG. 1 is a perspective view of one embodiment of the present invention showing the gripping unit positioned over a container lip and bag with a clasping unit shown in phantom and also shown partially installed over the gripping unit.

Referring to FIGS. 1 and 2, a clip assembly in accordance with one embodiment of the invention is illustrated and designated generally by the numeral 10. The clip assembly has a gripping or clamping unit 15 having two arms or wings 2 that are generally rectangular in shape and may be slightly curved. Each arm has a ribbed inner surface 3 for positively gripping flexible bag 4 and lip 8 of container or vessel 5. Alternatively, the inner surface can consist of projections, ridges, grooves, cross-hatching or any other suitable configuration. Other embodiments of the gripping unit may have arms split into two or more separate parts. As shown in FIG. 4, this embodiment of gripping unit 15 can have slightly curved arms 2 that approximate the curvature of the container 5.

As shown in FIGS. 2 and 5, arms 2 are connected by bridge or connector 6. The bridge has two positioning or locking tabs 7 that engage with clasping unit 20, shown in FIG. 3. Channeled outer section 9 on each arm 2 is located beneath the locking tabs. The channeled section may be formed with ridges, grooves, or any suitable configuration for engaging with the clasping unit.

Now referring to FIGS. 6 and 7, an alternative embodiment gripping unit 15 is illustrated. Bridge 6 is narrow to accommodate narrow container lips which might be found on metal garbage cans. In this embodiment, arms 2 are much closer together and can be curved or straight, to accommodate curved containers. In a similar manner, bridge and arm proportions can be individualized to suit distinct containers.

Clasping or clinching unit 20 is illustrated in FIG. 3 and is shown in position and in phantom in FIG. 1. The clasping unit is generally U-shaped with an upper surface 11 and two arms or sides 12. In a preferred embodiment, the distal end of each arm terminates in a curled segment 13 that extends the entire width of the arm. Alternatively, the curled section may reside at only one or more sections of each arm 12. Curled section 14 is located at the upper end of each arm 12 and, in some embodiments, may only reside at one or more sections of the arm.

Figure 8:
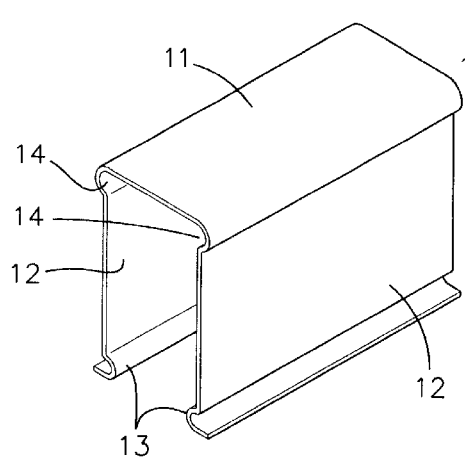
FIG. 8 is a perspective view of an alternative embodiment of the clasping unit for use with the gripping unit of FIG. 6.

FIG. 8 shows an alternative embodiment of clasping unit 20. Upper surface 11 is narrow to match the narrow bridge gripping unit shown in FIGS. 6 and 7. Arms 12 are now much closer together to engage channel section 9.

Figure 9:
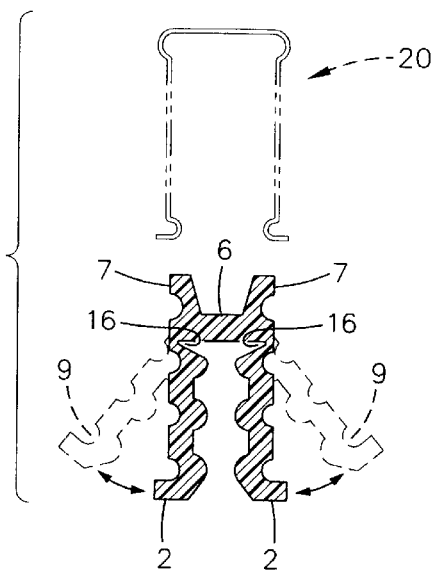
FIG. 9 is an elevation view of a clasping unit of FIG. 6 shown in phantom and a gripping unit showing the arms in closed gripping position and in spread position in phantom.

As shown in FIG. 1, container 5, having a relatively wide, reverse curved lip or rim, is engaged by arms 2 near container lip 8. In one embodiment of gripping unit 15 arms 2 are splayed or spread, as shown in FIGS. 2 and 6, to permit easy positioning of the gripping unit over a container. Clasping unit 20 then closes the clip over the bag and the container lips as seen in FIG. 9, the narrow gripping unit is illustrated with the arms shown in the gripping position and in the spread position in phantom. The arms pivot about living hinges 16 that do not fatigue, and thus the arms can be repeatably cycled from the disengaged, or spread position, to the gripping position many times without failure. If desired, arms 2 may be normally biased to the spread position for ease of positioning over the container lip.

Now referring to FIGS. 1 and 9, clasping unit 20 is positioned over bridge 6 and curled segments 13 are positioned to engage the gripping unit. The clasping unit, which is preferably made of spring steel, forces arms 2 into the gripping position to firmly trap or secure bag 4 against container 5 when forced downwardly to the final position with curled segments 13 seated in bottom depressions 9. Upper curled section 14 provides gripping projections to enable the clasping unit to be pulled upwardly to disengage the clip assembly from the bag and container. In a preferred embodiment, the clasping unit is muti-positionable along the channeled outer section. This allows for variable clamping force against the container and for quick and easy removal of clip assembly 10 from the container.

The gripping unit and the clasping unit can be formed of plastics, spring steels, fiberglass, rubber, polyurethane or other suitable materials.

Figure 10:
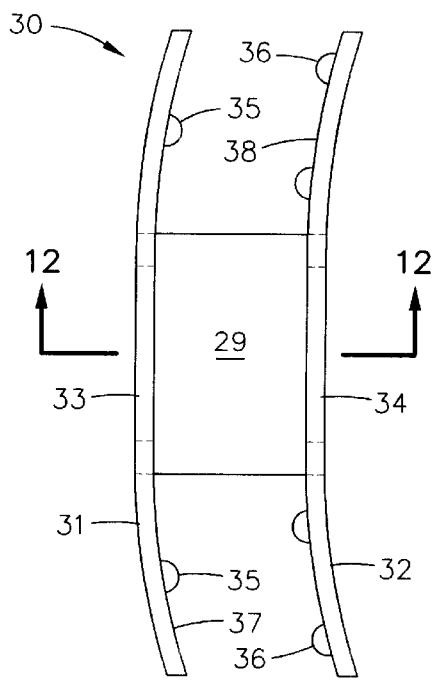
FIG. 10 is a top view of an alternative unitary clip embodiment of the invention.
Figure 12:
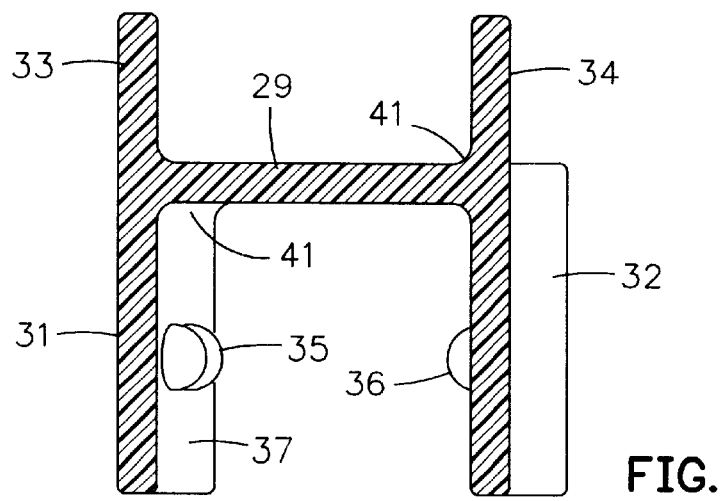
FIG. 12 is an end sectional view taken along cutting plane 12—12 in FIG. 10.
Figure 13:
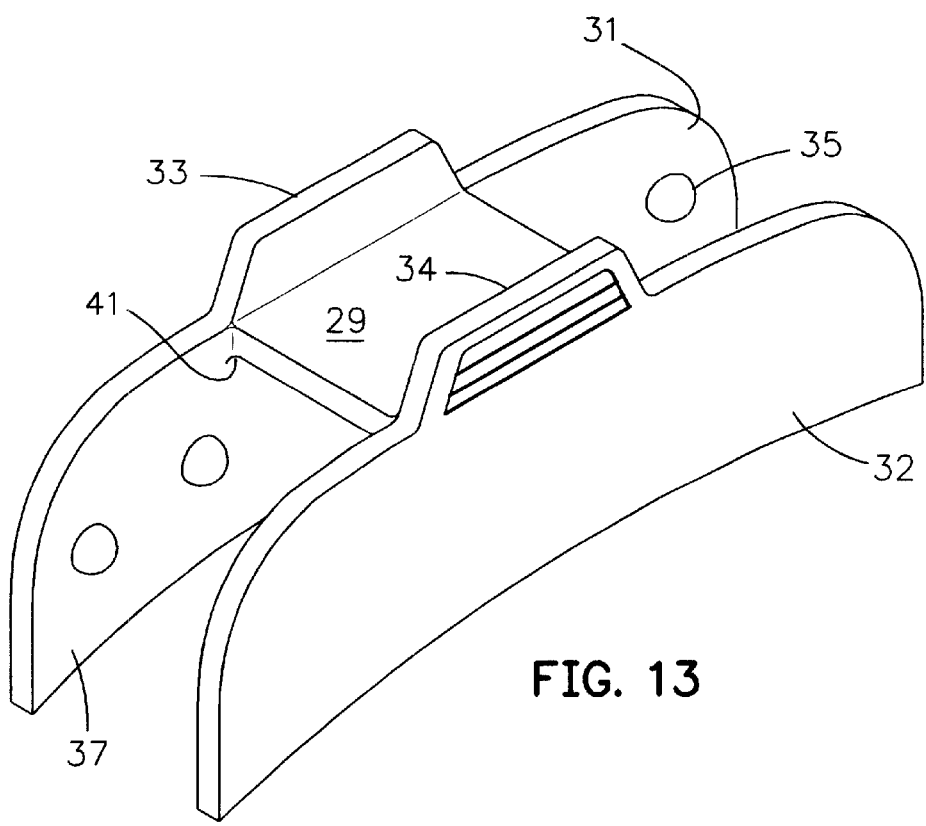
FIG. 13 is a perspective view of the FIG. 10 embodiment.

With reference now to FIGS. 10, 12 and 13, another embodiment of the clip of the invention is shown. Clip 30 is a unitary device having bridge 29 which is generally rectangular in shape, and elongated arms 31, 32. This configuration can be used with straight arms, or curved arms as shown in FIG. 10. Grip elements 33, 34 are formed to have sufficient height to allow manual deformation so that arms 31, 32 can be spread slightly as needed to be placed over the bag and container lid. However, the height of the grip elements is such that it does not interfere with the use of a lid on the container. Inwardly projections 35, 36 are staggered along a horizontal axis on the inner surfaces 37, 38 of arms 31, 32, respectively. The projections are preferably rounded so as to prevent tearing of the bag. Alternatively, arms 31, 32 can consist of a ribbed inner surface, such as shown in FIG. 2, for securing a flexible bag to the rim of a container or vessel. It is also contemplated herein that inner surfaces 37, 38 can have projections, ridges, grooves, cross-hatching or any other suitable configuration known to those skilled in the art to be able to provide sufficient retention while causing no unacceptable tearing of the bag.

Figure 11:
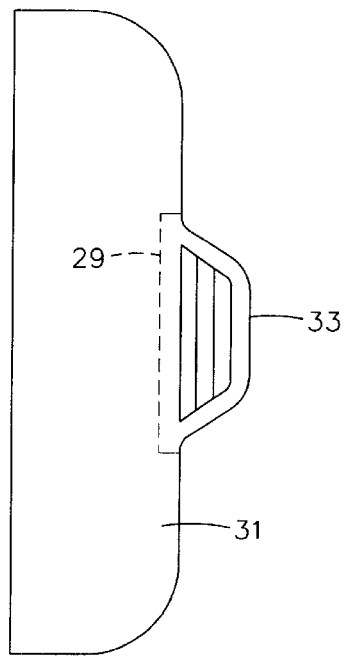
FIG. 11 is a side view of clip shown in FIG. 10.

The relative height of the arm 31 and grip element 33 are shown in FIG. 11. The relative placement of bridge 29 is shown clearly in FIGS. 11 and 12. In a particularly preferred embodiment the height of grip 33 is about 0.28 inch above bridge 29, the bridge is about 0.075 inch thick and arms 31, 32 extend about 0.662 inch below bridge 29.

In a preferred embodiment the clip 30 is unitary and may be formed as a single piece of suitable plastic. The plastic material should be relatively rigid but also slightly deformable to enable arms 31, 32 to be spread slightly by applying pressure to opposed grip elements 33, 34, and return to their original relative positions when the pressure on the grip elements is released. An example of a plastic that will satisfy the requirements of the invention is a copolymer polypropylene.

In the embodiment of FIGS. 10–13, the unitary clip consists of semi rigid bridge 29, which will temporarily deform when pressure is applied on grip elements 33, 34, thereby slightly separating arms 31, 32 for attachment to a bag and container. Material 41, at the junction of the bridge and arms creates the requisite compromise between rigidity and elasticity such that the bridge serves the function of the hinge and lock as in the FIGS. 1 and 6 embodiments. Once pressure is removed from the grip elements, the clip immediately returns to its original shape, thus providing sufficient pressure to secure the bag to the container.

Certain preferred embodiments have been described above. It is to be understood that a latitude of modification and substitution is intended in the foregoing disclosure, and that these modifications and substitutions are within the literal scope, or are equivalent to the claims that follow. Accordingly, the following claims should be construed broadly and in a manner consistent with the intent and scope of the invention herein described.

What is claimed is:

1. For use with a container formed with an open top surrounded by a rim and normally having a removable lid, a clip assembly for affixing a pliable bag to a container, the clamp comprising;

a unitary grabbing device selectively capable of an open position and a closed position, said grabbing device comprising;

spaced opposing arms interconnected by a bridge element which extends between said arms, said arms each having a distal edge extending from said bridge element, said arms having spaced confronting faces which are normally about parallel to each other in the closed position; and each said arm having an integral grip element extending about said bridge element to provide leverage for the manual deformation of the clamp to slightly, selectively spread the distal edges of the arms apart in an open position, said grip element extending upwardly from said bridge element such a small distance as to avoid interference with a container lid when a lid is engaged on the top of a container;

wherein said grabbing device is shaped and configured to affix the bag against a container rim when in the normal closed position, and to release of the bag from a container rim when in the open positioned.

2. The clip assembly of claim 1, wherein said bridge element is shaped and configured with a width corresponding to the width of the rim of the container to which it is intended to engage.

3. The clip assembly of claim 1, wherein said arms extend from the bridge element in a substantially U-shaped configuration.

4. The clip assembly of claim 1, wherein said confronting faces of said arms are formed with irregularities to facilitate positive engagement with a bag on a container rim.

5. The clip assembly of claim 4, wherein said irregularities are semispherical bumps.

6. The clip assembly of claim 5, wherein said bumps are arranged in an alternating fashion on opposite faces of said arms.

7. The clip assembly of claim 1, wherein said confronting faces of said arms are formed with a plurality of parallel ridges along the width of the arms.

* * * * *

UNITED STATES PATENT AND TRADEMARK OFFICE
CERTIFICATE OF CORRECTION

PATENT NO. : 6,484,374 B2
DATED : November 26, 2002
INVENTOR(S) : Robert J. McAllister It is certified that error appears in the above-identified patent and that said Letters Patent is hereby corrected as shown below:

Column 4,
Line 57, "about" should be -- above --.

Signed and Sealed this

Eleventh Day of May, 2004

JON W. DUDAS
*Acting Director of the United States Patent and Trademark Office*